United States Patent
Madan et al.

(10) Patent No.: US 10,021,033 B2
(45) Date of Patent: Jul. 10, 2018

(54) CONTEXT DRIVEN POLICY BASED PACKET CAPTURE

(71) Applicant: Nicira, Inc., Palo Alto, CA (US)

(72) Inventors: Rahul Madan, Palo Alto, CA (US); Farzad Ghannadian, Palo Alto, CA (US); Hamza Aharchaou, San Jose, CA (US); Aditi Vutukuri, Atlanta, GA (US)

(73) Assignee: Nicira, Inc., Palo Alto, CA (US)

( * ) Notice: Subject to any disclaimer, the term of this patent is extended or adjusted under 35 U.S.C. 154(b) by 34 days.

(21) Appl. No.: 15/372,101

(22) Filed: Dec. 7, 2016

(65) Prior Publication Data

US 2018/0159782 A1    Jun. 7, 2018

(51) Int. Cl.
| | |
|---|---|
| *H04L 12/851* | (2013.01) |
| *H04L 12/743* | (2013.01) |
| *H04L 12/721* | (2013.01) |
| *H04L 29/08* | (2006.01) |
| *H04L 29/12* | (2006.01) |
| *H04L 12/833* | (2013.01) |
| *H04L 12/813* | (2013.01) |
| *G06F 9/455* | (2018.01) |

(52) U.S. Cl.
CPC ...... *H04L 47/2483* (2013.01); *G06F 9/45558* (2013.01); *H04L 45/38* (2013.01); *H04L 45/72* (2013.01); *H04L 45/7453* (2013.01); *H04L 47/20* (2013.01); *H04L 47/31* (2013.01); *H04L 61/2007* (2013.01); *H04L 67/141* (2013.01); *G06F 2009/45591* (2013.01)

(58) Field of Classification Search
CPC ..... H04L 47/2483; H04L 45/38; H04L 45/72; H04L 45/7453; H04L 47/20; H04L 47/31; H04L 61/2007; H04L 67/141; G06F 9/45558; G06F 2009/45591
See application file for complete search history.

(56) References Cited

U.S. PATENT DOCUMENTS

| | | | | |
|---|---|---|---|---|
| 2012/0284712 | A1* | 11/2012 | Nimmagadda | G06F 9/5077 718/1 |
| 2015/0370586 | A1* | 12/2015 | Cooper | G06F 9/45533 710/308 |
| 2016/0232019 | A1* | 8/2016 | Shah | G06F 9/45558 |
| 2017/0339247 | A1* | 11/2017 | Tiwari | H04L 67/32 |

* cited by examiner

*Primary Examiner* — Duc C Ho

(74) *Attorney, Agent, or Firm* — Patterson & Sheridan LLP

(57) ABSTRACT

A computer system provides a method for context-based packet scanning in a computing environment. The method includes the steps of receiving a packet from a virtual machine, determining if a network flow associated with the packet exists in a context data structure, and upon determining that a context entry associated with the network flow exists in the context data structure, tagging the packet with context information included in the context entry, comparing the context information and network flow information to context and network flow criteria in one or more packet capture policies, and recording contents of the packet when the context information and network flow information match one of the one or more packet capture policies.

20 Claims, 4 Drawing Sheets

CONTEXT DRIVEN POLICY BASED PACKET CAPTURE

BACKGROUND

Computing devices are often coupled to a network that provides connectivity and various services to the computing devices. Problems with the network may be monitored and resolved by network administrators using outputs generated by traditional analytics and diagnostic tools.

Software-defined networking (SDN) has become more prevalent for configuring, provisioning, and modifying networks, as SDN reduces the time needed to administer a network. In particular, SDN may be used to configure a logical network that can be more easily administered. However, problems in such a logical network may be more difficult to monitor and resolve.

Typical packet capture tools used to identify sources of problems in a physical network may not be sufficient for quickly addressing problems in a logical network and may be resource intensive. For example, packet capture tools allow packets communicated in a network to be captured by an administrator and analyzed to help identify problems in the network. Capturing all the packets in the network may not be feasible due to resource constraints. Accordingly, some packet capture tools may filter the packets captured based on Internet protocol (IP) addresses associated with the packets.

However, even such filtering may still be insufficient in a network. For example, the distributed nature of a logical network may make it difficult to identify where in the network to implement packet capture for a problem with a particular application or a particular computing device. For example, if a particular user is having a problem with a particular application accessing the logical network, a system administrator may first need to identify each instance of the application running on the logical network, the logical switches the application is connected to, on what physical machines those logical switches reside, and only then be able to start the appropriate packet capture.

SUMMARY

One or more embodiments implement a method of context-based packet scanning in a computing environment. The method includes the steps of receiving a packet from a virtual machine, determining if a network flow associated with the packet exists in a context data structure, and upon determining that a context entry associated with the network flow exists in the context data structure, tagging the packet with context information included in the context entry, comparing the context information and network flow information to context and network flow criteria in one or more packet capture policies, and recording contents of the packet when the context information and network flow information match one of the one or more packet capture policies.

Further embodiments include a non-transitory computer-readable storage medium storing instructions that, when executed by a computer system, cause the computer system to perform the method set forth above, and a computer system programmed to carry out the method set forth above.

DETAILED DESCRIPTION

Figure 1:
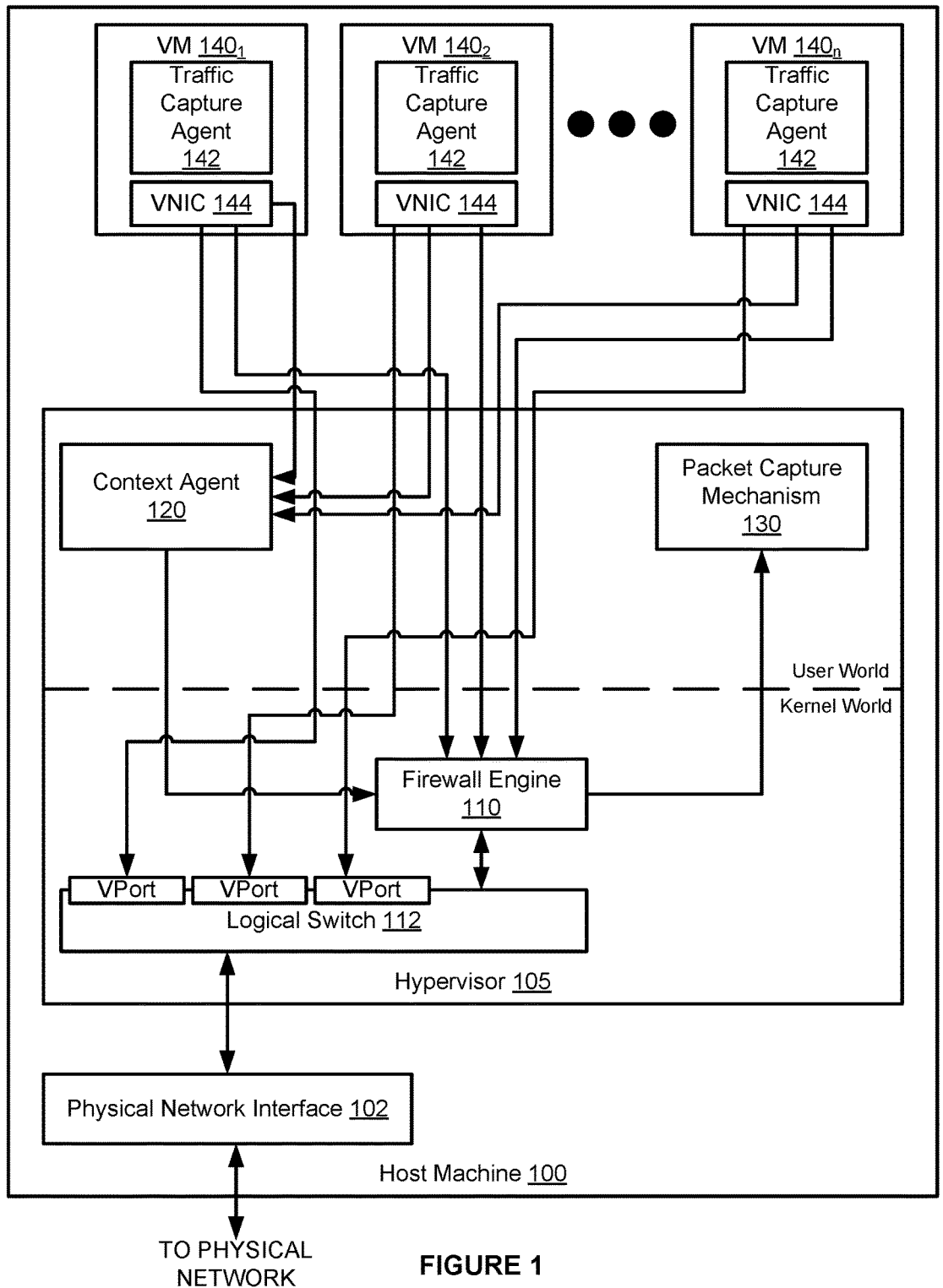
FIG. 1 is a block diagram of a computing environment in which a context-based packet capture mechanism is used to analyze network traffic in the computing environment, according to some embodiments.

FIG. 1 illustrates an example host machine 100 that is a member of a virtualized computing environment, according to some embodiments. As illustrated, host machine 100 includes a network interface 102, hypervisor 105, firewall engine 110, context agent 120, packet capture mechanism 130, and one or more virtual machines 140. Host machine 100 has access to a physical network through physical network interface 102. Hypervisor 105, which, as illustrated, includes a firewall engine 110 and a logical switch 112 in a kernel space of the hypervisor, serves as an interface between the hosted virtual machines 140 and physical network interface 102, as well as other physical resources available on host machine 100. Firewall engine 110 generally monitors logical ports provided by infrastructure components (e.g., logical switch ports, logical router ports, and so on) in host machine 100 for the establishment of new connections between a virtual machine 140 and a logical port. In alternate embodiments, firewall engine 110, along with virtual switch and physical device drivers, may execute in a privileged virtual machine. The privileged virtual machine may be referred to variously as a "Domain zero," "root-partition," or "parent-partition. Hypervisor 105 additionally includes the context agent 120 and the packet capture mechanism 130. Context agent 120 may exist in a user space in hypervisor 105. Packet capture mechanism 130 may exist in a virtual machine provisioned by hypervisor 105 or in a user world component of hypervisor 105 or another hypervisor.

While the example embodiment of FIG. 1 is one in which the physical host machine 100 is connected to a physical network, the packet-capture approach that is described below operates well in a software-defined network (SDN) in which the host machine is one of the virtualized components of a virtual network. Additionally, the packet-capture approach may be implemented in environment in which VMs do not reside in a single host.

Further, each virtual machine 140 may exist in a user space of a hypervisor, including hypervisor 105, or another hypervisor installed on a different physical device than hypervisor 105. Multiple virtual machines 140 may exist on a single hypervisor.

Each hypervisor (e.g., hypervisor 105 or other hypervisors associated with virtual machines 140) may be installed on a separate hardware platform and provide operating system functionality (e.g., process creation and control, file system, process threads, etc.) as well as central processing unit (CPU) scheduling and memory scheduling across multiple virtual machine execution spaces within the hypervisor. A virtual machine process is executed within each virtual machine execution space to manage a virtual hardware platform for a virtual machine 140. A virtual machine monitor may be associated with each virtual machine 140 and coordinate operations between the hypervisor and virtual machine 140.

Virtual machines 140 may host a plurality of workloads which may be used by one or more users to generate network traffic and transmit the network traffic to destinations inside or outside a computing environment that host machine 100 is a member of. As illustrated, each virtual machine 140 includes a traffic capture agent 142 and a virtual network interface card (VNIC) 144, which is responsible for exchanging packets between the virtual machine 140 and hypervisor 105. VNICs 144 may be, in some cases, a software abstraction of a physical network interface card implemented by an emulator and may include a firewall filter for identifying relevant firewall rules and applying the relevant firewall rules for filtering packets. Each virtual machine 140 is connected to a virtual port provided by logical switch 112, and the virtual switch is connected to physical network 102 to allow network traffic to be exchanged between virtual machines 140 executing on host machine 100 and external network destinations. While hypervisor 105 is illustrated as including logical switch 112, it should be recognized that hypervisor 105 may additionally expose virtual ports to one or more virtual machines 140 using a logical router or other logical networking infrastructure provided by hypervisor 105.

Traffic capture agent 142 may be an operating system driver or daemon that captures network control events (e.g., connection, pre-connection, disconnection) generated by the virtual machine based on user action. Traffic capture agent 142 generally transmits the network control events to context agent 120 (either directly or via a user world service) with information identifying the context of the network control event (e.g., a user identifier, application identifier, or other information) to establish or delete entries in a context data structure, as discussed below. In one embodiment, the context data structure is a context table. The following description will be with respect to the embodiment in which the data structure is a table.

Context agent 120 generally receives network control events and other information about network traffic from the one or more virtual machines 140. Based on the received network control events and other network traffic information, context agent 120 creates and removes context entries in a context table used by firewall engine 110 for determining whether to tag packets (i.e., network traffic) for analysis, according to some embodiments. In some cases, context agent 120 can receive context information from the virtual machines 140 executing on host machine 100 directly or through a user-world component that communicates with a traffic capture agent 142 on a virtual machine 140 and forwards network events to context agent 120.

When context agent 120 receives information indicative of a pre-connection or connection event from traffic capture agent 142 (e.g., before the virtual machine 140 transmits a synchronization packet to the network destination), context agent 120 generates a new entry in the context table representing a new network flow. To create an entry in the context table, context agent 120 generates a table entry associating information about the network flow (e.g., packet protocol, source information, and destination information, such as in a 5-tuple of {protocol, source IP address, source packet, destination IP address, destination port}) with information about the user and/or application that generated the packet. The information about a user that generated the packet may include, for example, a security identifier (SID) or other identifier issued by a network security authority to uniquely identify a user. The information about an application that generated the packet may include, for example, a globally unique identifier, an application name and version information, or other data that uniquely identifies the application that generated the packet. In some cases, the information about the network flow may be hashed and used as a key value in the context table, and the hash may be calculated such that no two network flows have the same key value. In some embodiments, both the information about the network flow and information about a user that generated the packet may be hashed and stored in the context table as hash values.

When a user terminates a connection with a destination machine, a virtual machine 140 transmits a disconnect message to the destination machine. Context agent 120 receives the disconnect message from traffic capture agent 142 in the virtual machine 140 and removes the corresponding context table entry from a context table maintained by context agent 120.

Firewall engine 110 generally receives network packets from virtual machines 140. For a given received network packet, firewall engine 110 determines if an entry corresponding to the network packet exists in the context table generated by context agent 120. For example, if context agent 120 generates entries in the context table with information about the network flow as a key for each entry in the context table, context agent 120 extracts the key information from the received packet and compares the packet information to entries in the context table.

If an entry exists in the context table for a network flow associated with a packet received at firewall engine 110, firewall engine 110 obtains information identifying the user and/or application that generated the network flow from the context table. Subsequently, in some embodiments, firewall engine 110 can append metadata (e.g., in a portion of the network packet allocated for metadata referred to as a tag) to the received network packet to tag the packet. The metadata may include information about the context of the packet, such as the source user and/or application information stored in the context table in association with information about the network flow. Once tagged, the firewall engine 110 forwards the packet to packet capture service 130 for analysis.

In some cases, the firewall engine 110 selectively applies a tag to the packet on the basis of a packet configuration that distinguishes the type of packet (i.e. identifies types of network traffic). The tagged packet is then forwarded to the packet capture mechanism 130. The processing may be based on a packet capture (e.g., logging or reporting) policy implemented by packet capture mechanism 130, as discussed below. In certain situations, firewall engine 110 may apply tags to Transmission Control Protocol (TCP) packets and forward received TCP packets to packet capture service 140, but may not apply tags to other types of packets (e.g., Universal Datagram Protocol (UDP) packets, Internet Control Message Protocol (ICMP) packets, and so on). In other examples, firewall engine 110 may tag UDP packets, ICMP packets, or other network traffic identified in a configuration policy. Firewall engine 110 transfers tagged packets to packet capture mechanism 130 for analysis and reporting, but need not transfer untagged packets to packet capture mechanism 130.

Packet capture mechanism 130 receives tagged packets from firewall engine 110 and examines the contents of the tagged packets to determine whether to log information about the tagged packets. Packet capture mechanism 130 determines whether to log information about each of the tagged packets based on the tag applied to the packet. If the packet does not include a tag, packet capture mechanism 130 need not parse and analyze the packet.

Otherwise, if the packet includes a tag, packet capture mechanism 130, based on the metadata information in the tag and, in some cases, network flow information included in the packet, determines if the packet is covered by a packet capture policy (e.g., a logging policy, a reporting policy, a packet analysis policy, and so on). In some cases, the packet capture policy can identify network activity generated by specific users or by specific applications as network activity to be captured and logged. In some cases, the packet capture policy can identify specific types of activity to log, which may include attempts to access specified files or types of files, network destinations, applications, and so on. In some cases, the packet capture policy may be configured to obtain and parse the contents of a captured packet using a packet analysis tool and then log and/or report specified portions of the parsed content.

In one example, a packet capture policy may be configured to log specific activity (e.g., attempts to access protected resources in a computing environment) performed by specific users in the computing environment that host machine 100 is a member of. The users identified in a packet capture policy may be specific users or named groups of users. Establishing packet capture policies based on named groups of users may allow administrators to set up packet capture policies based on groups of users that are allowed or not allowed to access specific resources, such as a policy that logs attempts to access financial applications and data performed by users who are not members of a finance department group allowed to access the financial applications.

If packet capture mechanism 130 determines that the metadata in a tag of a packet matches metadata in a packet capture policy, packet capture service 130 processes the packet according to the packet capture policy. For example, packet capture mechanism 130 can store captured packets with metadata matching a packet capture policy in a persistent data store in the computing environment (e.g., in a log file or an event database). In some cases, packet capture mechanism 130 can send e-mails or other alerts to a system administrator to indicate that traffic generated by a specific user meets a packet capture policy. In some cases, packet capture mechanism 130 can provide an interface for an administrator to connect to packet capture mechanism 130 and view captured traffic that meets a packet capture policy.

Figure 2:
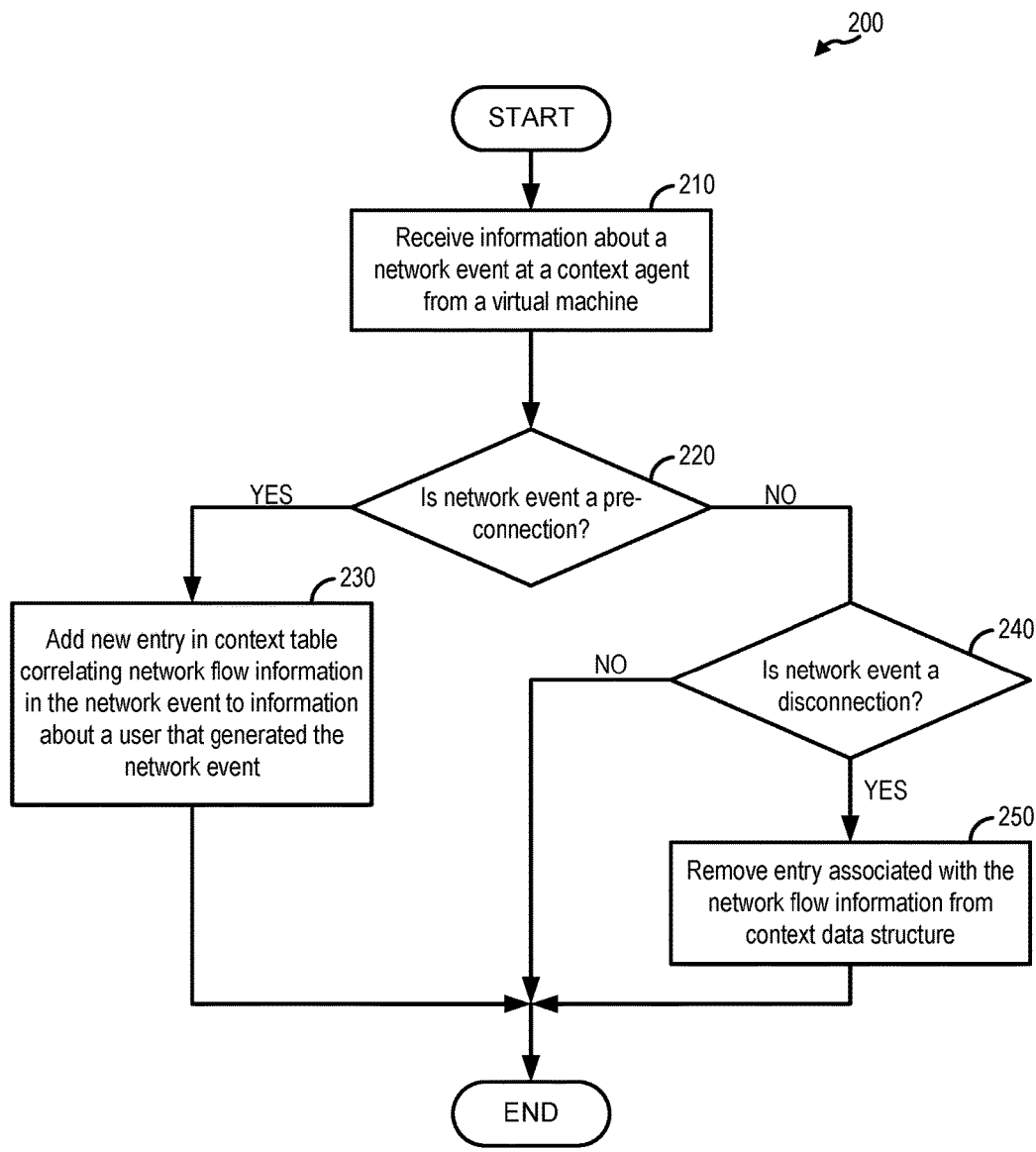
FIG. 2 illustrates example operations that may be performed by a context agent to establish or remove contexts related to network traffic in a computing environment between a virtual machine and another device, according to some embodiments.

FIG. 2 illustrates example operations that may be performed by a context agent 120 to add and remove entries in a context table based on network control events received at the context agent 120, according to some embodiments. As illustrated, operations 200 begin at step 210, where context agent 120 receives information about a network event from a virtual machine, such as in a packet.

At step 220, context agent 120 determines if the network event indicates the establishment of a connection with a network destination (e.g., if the network event is a pre-connection or a connection request). If the answer to step 220 is YES, then at step 230, the context agent adds a new entry in the context table. The new entry generally correlates network flow information in the network event to information about a user that generated the network event. For example, as discussed above, context agent 120 can generate a hash of the network flow information and associate the generated hash to a user identifier. Operations 200 then terminate.

If, at step 220, the answer is NO, then at step 240, context agent 120 determines if the network event indicates a disconnection between the virtual machine and the network destination. If the answer to step 240 is NO, operations 200 terminate. Otherwise, the answer to step 240 is YES, and at step 250, context agent 120 removes the entry associated with the network flow information from the context table. Operations 200 then terminate.

Figure 3:
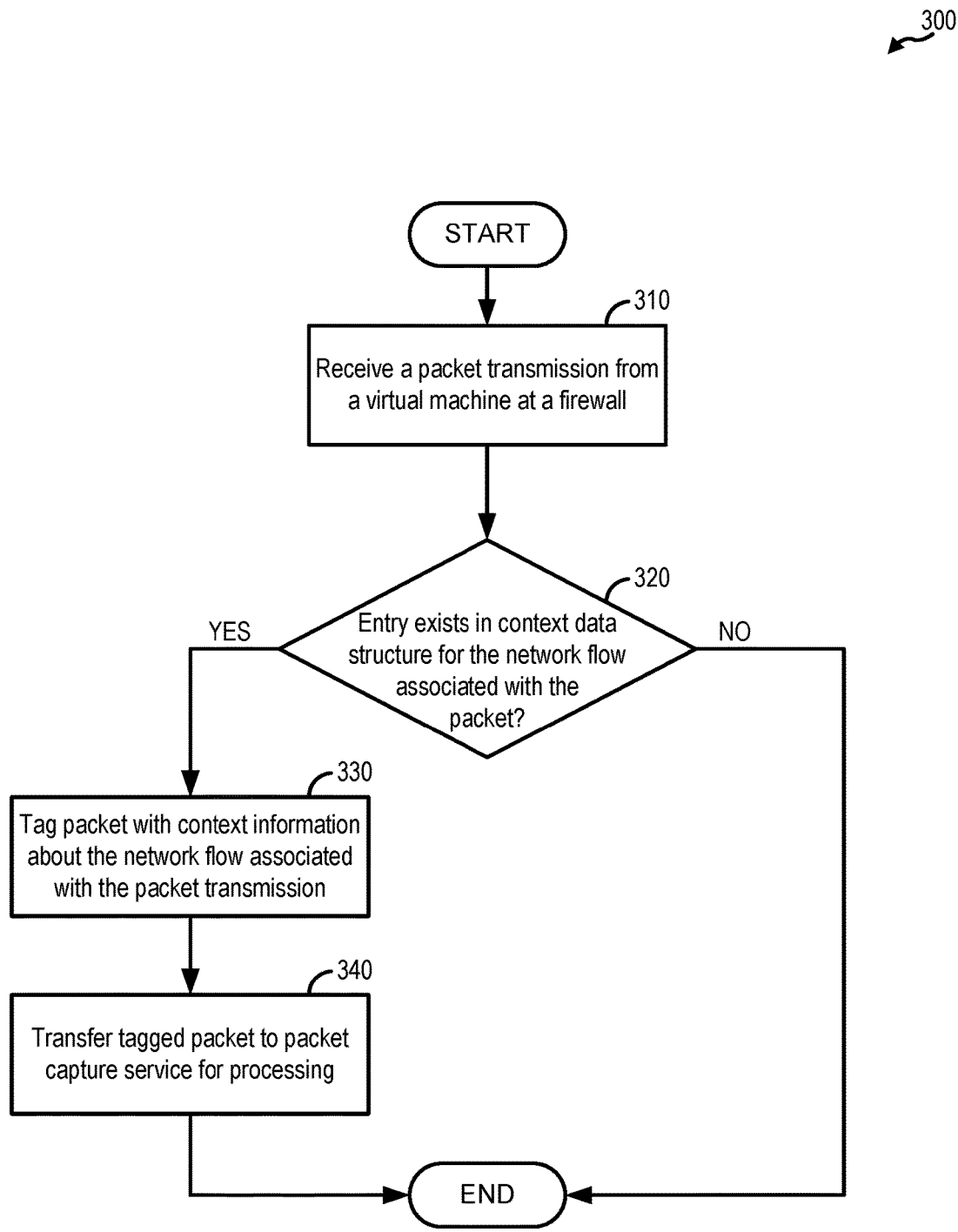
FIG. 3 illustrates example operations that may be performed by a firewall to tag packets for analysis by a packet capture service, according to some embodiments.

FIG. 3 illustrates example operations that may be performed by a firewall 110 to tag packets for examination by a packet capture mechanism, according to some embodiments. As illustrated, operations 300 begin at step 310, where a firewall receives a packet transmission from a virtual machine. At step 320, the firewall examines the context table to determine if an entry exists in the context table for the network flow associated with the packet transmission.

If the answer at step 320 is NO, firewall 110 can determine that a packet capture policy does not exist for the network flow identified in the packet. Operations 300 may terminate, and the packet may be transferred to the destination identified in the packet.

If the answer at step 320 is YES, then operations 300 proceed to step 330, where the firewall tags the packet with additional context information associated with the network flow. After firewall 110 tags the packet to add context information to the packet, at step 340, firewall 110 transfers the tagged packet to packet capture mechanism 130 for processing.

Figure 4:
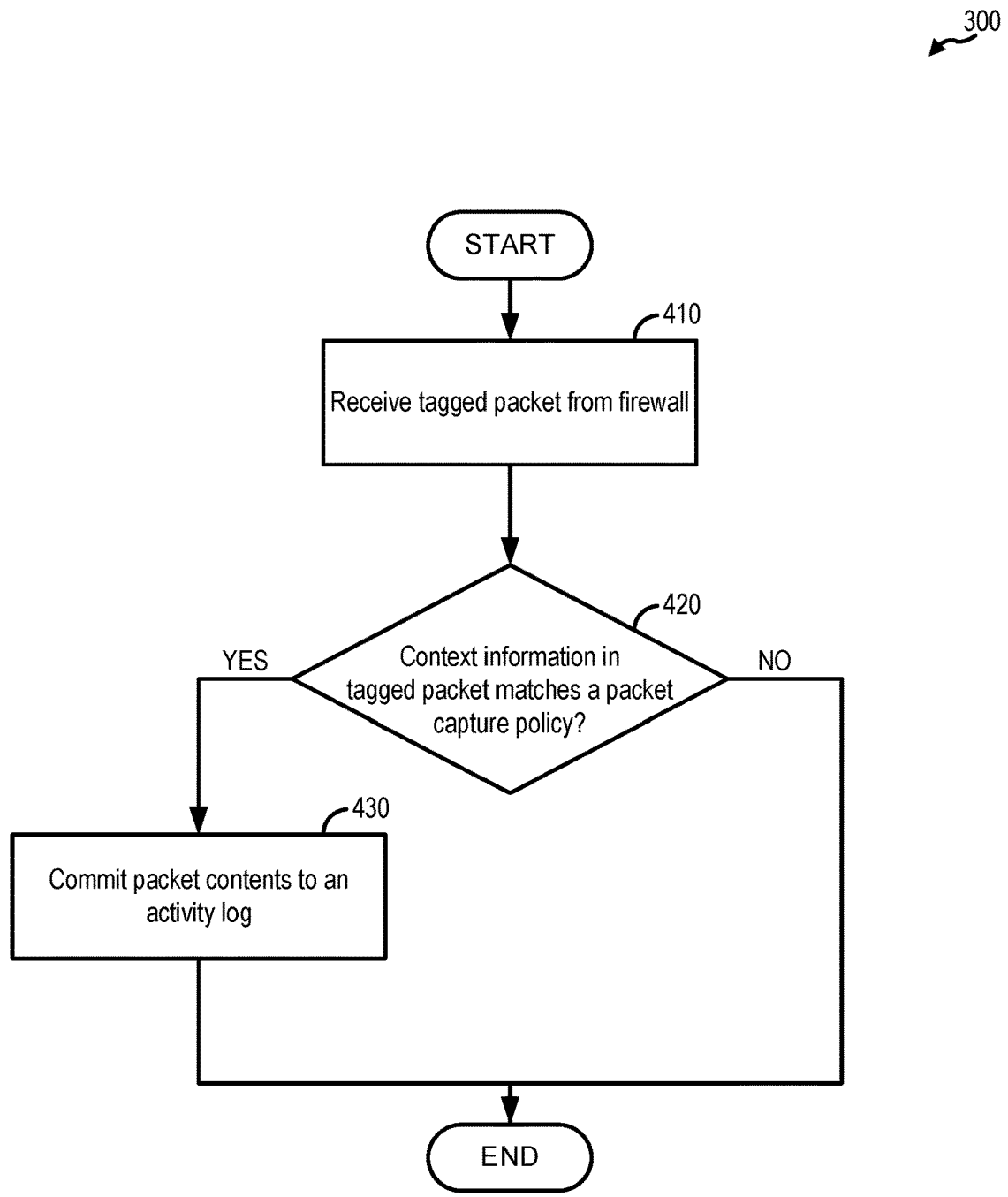
FIG. 4 illustrates example operations that may be performed by a packet capture mechanism to identify packets to parse and log, according to some embodiments.

FIG. 4 illustrates example operations for logging and reporting network activity represented by a tagged packet received from firewall 110, according to some embodiments. As illustrated, operations 400 begin at step 410, where packet capture mechanism 130 receives a tagged packet.

At step 420, packet capture mechanism 130 determines if the context information in the tagged packet matches a packet capture policy established at packet capture mechanism 130.

If the answer to step 420 is NO, packet capture mechanism 130 determines that information about the packet need not be logged and reported to a system administrator. Operations 400 may terminate with packet capture mechanism 130 discarding the packet. Otherwise, the answer to step 420 is YES, meaning that the context information in the tagged packet matches one or more policies established at packet capture service 130. In response, packet capture mechanism 130 proceeds to commit packet contents to an activity log. To commit the packet contents to an activity log, packet capture mechanism 130 parses the packet to obtain information about the transmission. The information may include a timestamp indicating when the packet was generated and transmitted from the source virtual machine, data identifying the source and destination machines, and information about the data requested from the destination or data transferred to the destination. Packet mechanism service 130 can identify data requested from a destination, for example, based on a uniform resource locator (URL) or uniform resource indicator (URI) included in the packet, information in an HTTP GET or POST command, and so on. Information about data transferred to the destination may be parsed, for example, from the contents of an FTP request indicating files to be transferred to a destination machine.

After packet capture mechanism 130 parses the packet, packet capture mechanism 130 can store the packet information, such as in an activity log, and/or alert a user. The context based packet capture allows network administrators to capture network traffic based on user name or application. It would significantly improve the time required to root cause several networking problems and makes the network administrators more effective. In turn it also lowers company costs related to networking outages.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:
1. A method comprising:
receiving a packet from a virtual machine;
determining if a network flow associated with the packet exists in a context data structure; and
upon determining that a context entry associated with the network flow exists in the context data structure:
tagging the packet with context information included in the context entry;
comparing the context information and network flow information to context and network flow criteria in one or more packet capture policies; and
recording contents of the packet when the context information and network flow information match one of the one or more packet capture policies.

2. The method of claim 1, further comprising:
upon determining that the packet comprises a request to establish a connection with a network destination, writing the context entry associated with the network flow in the context data structure.

3. The method of claim 1, further comprising:
upon determining that the packet comprises a request to disconnect from the network destination, removing the context entry associated with the network flow from the context data structure, wherein the context data structure is a context table.

4. The method of claim 1, wherein the context entry comprises a hashed key representing the network flow and an identity of a user associated with the packet.

5. The method of claim 4, wherein tagging the packet with context information included in the context entry comprises tagging the packet with the identity of the user associated with the packet.

6. The method of claim 4, wherein the hashed key is generated by applying a hash function to a data set including at least a packet protocol, packet source information, and packet destination information.

7. The method of claim 6, wherein the packet source information comprises a source internet protocol (IP) address and a source port.

8. The method of claim 6, wherein the packet destination information comprises a destination internet protocol (IP) address and a destination port.

9. The method of claim 1, wherein the one or more packet capture policies comprises an identification of a type of traffic and a user for which packet contents should be recorded.

10. The method of claim 1, wherein the one or more packet capture policies comprise at least an indication of an application associated with a packet for which packet contents should be recorded.

11. A non-transitory computer readable medium comprising instructions to be executed in a computer system to cause the computer system to carry out a method for context-based packet scanning in a computing environment, said method comprising:
 receiving a packet from a virtual machine;
 determining if a network flow associated with the packet exists in a context data structure; and
 upon determining that a context entry associated with the network flow exists in the context data structure:
  tagging the packet with context information included in the context entry;
  comparing the context information and network flow information to context and network flow criteria in one or more packet capture policies; and
  recording contents of the packet when the context information and network flow information match one of the one or more packet capture policies.

12. The non-transitory computer-readable medium of claim 11, wherein the method further comprises:
 upon determining that the packet comprises a request to establish a connection with a network destination, writing the context entry associated with the network flow in the context data structure.

13. The non-transitory computer-readable medium of claim 11, wherein the method further comprises:
 upon determining that the packet comprises a request to disconnect from the network destination, removing the context entry associated with the network flow from the context data structure, wherein the context data structure is a context table.

14. The non-transitory computer-readable medium of claim 11, wherein the context entry comprises a hashed key representing the network flow and an identity of a user associated with the packet.

15. The non-transitory computer-readable medium of claim 11, wherein the one or more packet capture policies comprises at least one of:
 an identification of a type of traffic and a user for which packet contents should be recorded, or
 an indication of an application associated with a packet for which packet contents should be recorded.

16. A computer system comprising:
 a plurality of hosts, each having one or more virtual computing instances deployed thereon; and
 a network hypervisor configured to carry out a method for performing context-based packet scanning in a computing environment by:
  receiving a packet from a virtual machine;
  determining if a network flow associated with the packet exists in a context data structure; and
  upon determining that a context entry associated with the network flow exists in the context data structure:
   tagging the packet with context information included in the context entry;
   comparing the context information and network flow information to context and network flow criteria in one or more packet capture policies; and
   recording contents of the packet when the context information and network flow information match one of the one or more packet capture policies.

17. The system of claim 16, wherein the method further comprises:
 upon determining that the packet comprises a request to establish a connection with a network destination, writing the context entry associated with the network flow in the context data structure.

18. The system of claim 16, wherein the method further comprises:
 upon determining that the packet comprises a request to disconnect from the network destination, removing the context entry associated with the network flow from the context data structure, wherein the context data structure is a context table.

19. The system of claim 16, wherein the context entry comprises a hashed key representing the network flow and an identity of a user associated with the packet.

20. The system of claim 16, wherein the one or more packet capture policies comprises at least one of:
 an identification of a type of traffic and a user for which packet contents should be recorded, or
 an indication of an application associated with a packet for which packet contents should be recorded.

* * * * *